United States Patent [19]
Englund

[11] Patent Number: 6,135,257
[45] Date of Patent: Oct. 24, 2000

[54] OIL-COOLED DISC CLUTCH

[75] Inventor: Arnold Englund, Spånga, Sweden

[73] Assignee: Lysholm Technologies AB, Stockholm, Sweden

[21] Appl. No.: 09/147,899

[22] PCT Filed: Oct. 3, 1997

[86] PCT No.: PCT/SE97/01660

§ 371 Date: Mar. 22, 1999

§ 102(e) Date: Mar. 22, 1999

[87] PCT Pub. No.: WO98/15748

PCT Pub. Date: Apr. 16, 1998

[30] Foreign Application Priority Data

Oct. 9, 1996 [SE] Sweden .................................. 9603699

[51] Int. Cl.$^7$ .................................................. F16D 13/72
[52] U.S. Cl. .................... 192/70.12; 192/113.34
[58] Field of Search .................. 192/113.34, 70.12, 192/18 R, 18 A, 70.2

[56] References Cited

U.S. PATENT DOCUMENTS

| | | | |
|---|---|---|---|
| 4,646,889 | 3/1987 | Hoffman et al. ....................... | 192/70.12 |
| 5,806,645 | 9/1998 | Bhookmohan et al. ............. | 192/70.12 |
| 5,813,508 | 9/1998 | Shoji et al. ......................... | 192/113.34 |
| 5,921,361 | 7/1999 | Sommer ........................ | 192/113.34 X |

FOREIGN PATENT DOCUMENTS

| | | |
|---|---|---|
| 1350396 A1 | 11/1987 | Russian Federation . |
| 1661510 A1 | 11/1991 | Russian Federation . |

OTHER PUBLICATIONS

Derwent's Abstract, No. 88–159808/23, week 8823, Abstract of SU, 1350396 (Lengd Kalinan Poly), Nov. 7, 1987.

Derwent's Abstract, No. 92–190827/23, week 9223, Abstract of SU, 1661510 (Mosc Constr. Road Equip. Prodn. Assoc.) Jul. 7, 1991.

Patent Abstracts of Japan, vol. 12, No. 416, Abstract of JP 63–15727A (Kubota Ltd.), Jun. 25, 1988.

Patent Abstracts of Japan, vol. 15, No. 6, Abstract of JP 2–256926A (Nissan Motor Co., Ltd.), Oct. 17, 1990.

*Primary Examiner*—Charles A Marmor
*Assistant Examiner*—Saúl Rodriguez
*Attorney, Agent, or Firm*—Frishauf, Holtz, Goodman, Langer & Chick, P.C.

[57] ABSTRACT

An oil-cooled disc clutch includes a first group of discs (21) interleaved by another group of discs (20). The first group of discs (21) are non-rotatably attached by splines to a central axial hub (39). The central axial hub is designed as a drum (39) to which the oil is supplied through a channel (35), and which is provided with apertures (40, 44) for axial distribution of the supply of oil to and between all the discs (20, 21).

5 Claims, 1 Drawing Sheet

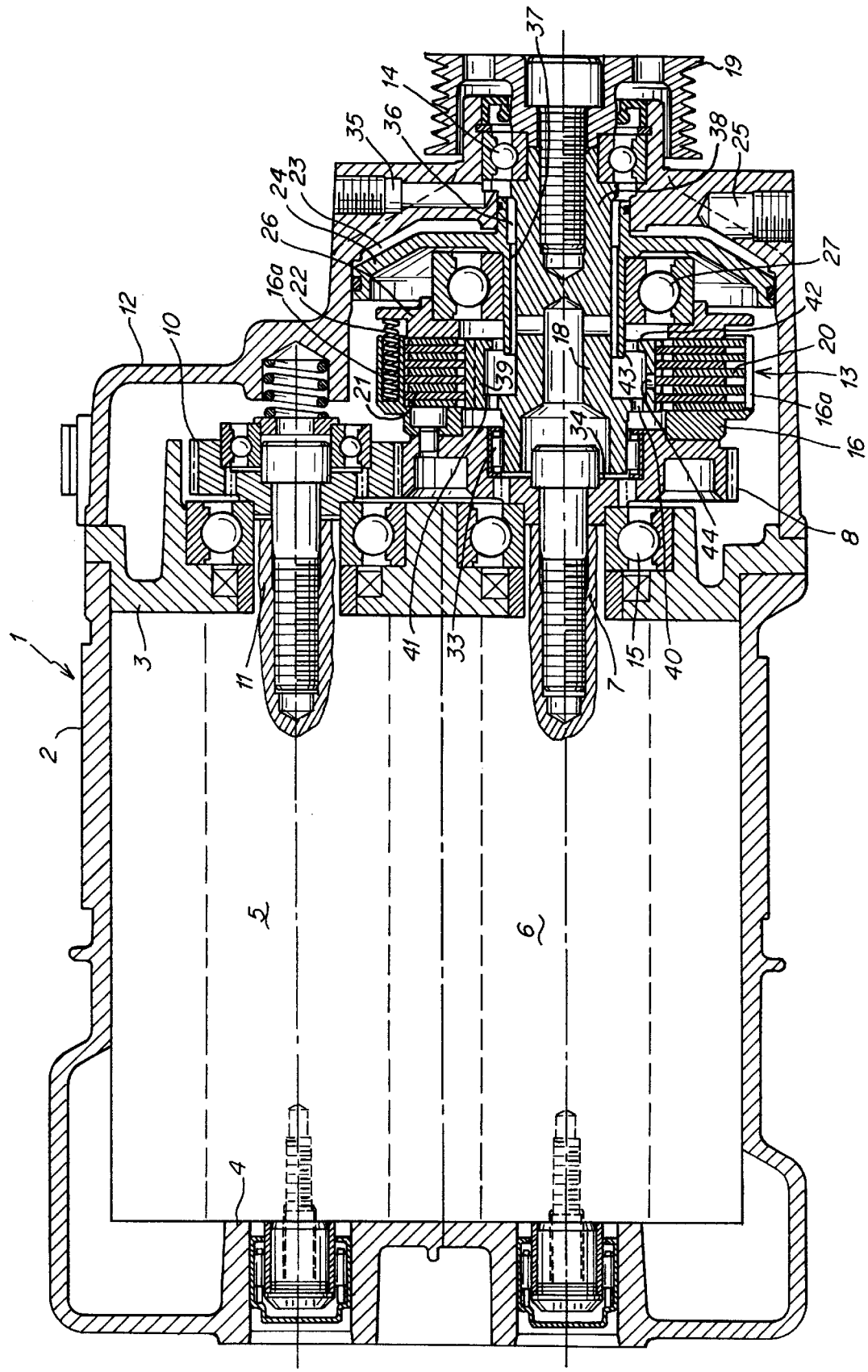

OIL-COOLED DISC CLUTCH

BACKGROUND OF THE INVENTION

The present invention relates to an oil-cooled disc clutch.

In disc clutches, the discs are supplied with oil for cooling and to a certain degree lubricating purposes. Practical tests have shown that the wear of the discs is very irregularly distributed, which seems to indicate that the oil is unable to penetrate the interspaces between all the discs resulting in that some of the discs are subjected to overheating and strong wear.

The object of the invention is to eliminate this inconvenience and to achieve a disc clutch having a longer live due to improved cooling.

SUMMARY OF THE INVENTION

The solution of the problem is that the central hub supporting the first group of discs, and which hub in known clutches strongly contributes to a bad distribution of the oil to the discs, is designed like a drum with apertures that distribute the supply of oil to the separate discs. According to the invention, when the clutch is disconnected, oil will flow into all the interspaces between the discs and cool their surfaces. Even when the clutch is connected oil will flow in all interspaces if the discs are provided with the usual radial grooves in the surfaces of the discs.

According to a preferred embodiment the hub is attached to a driving shaft of the clutch resulting in that the oil, also when the clutch is disconnected, is forced out through the apertures in the hub by the action of centrifugal force.

The supply of oil to the hub, designed like a drum, is accomplished by a slit between the driving shaft and a piston coaxial to the shaft, which piston is arranged to operate the clutch, and which slit is axially extended by a collar on the piston, which collar extends to the hub. As a result, an oil channel is ot arranged in the driving shaft, which would otherwise lead to undesired complications.

The invention is described more clearly in the following description with reference to the accompanying drawing schematically showing by way of example a longitudinal section of an embodiment of a clutch according to the invention integrated with a supercharger of an internal combustion engine.

DETAILED DESCRIPTION

The drawing discloses a screw compressor 1 with a rotor housing 2. At one end of the housing an end wall 3 is firmly attached. A male rotor 5 and a female rotor 6 are rotatably journalled in the end wall 3 and the opposite end wall 4.

The compressor is driven by an input shaft 7 that is secured to a synchronizing gear 8. A synchronizing gear 10 of the male rotor is secured to a shaft 11 of the male rotor.

An end wall part 12 is secured to the end wall 3 and forms a cover in which a clutch means 13 is journalled by two bearings 14 and 15.

The clutch means 13 comprises two main parts: one part 16 that is secured to the synchronizing gear 8, and one part 18 that extends out from the end wall part 12 and is secured to a belt pulley 19.

The clutch part 16 is in the usual way provided with a part 16a shaped like a sleeve with splines for receiving ring-shaped discs 20 which extend between corresponding discs 21 of the clutch part 18. A number of pressure springs 22 strive to keep the clutch parts and, accordingly, the discs 20,21 apart.

A cylinder chamber 23 is arranged in the end wall part 12, in which chamber an annular piston 24 is journalled to be axially movable. A pressure fluid channel 25 extends through the end wall part 12 to the cylinder chamber 23. A thrust bearing 27 is arranged between the annular piston 24 and a pressure plate 26 adjacent to an outer disc 20.

At supply of pressure fluid of the necessary pressure to the cylinder chamber 23, the annular piston 24 is moved towards the thrust bearing 27, which in turn is moved a small distance pushing the pressure plate 26 against the discs 20,21, which in the manner known per se are pressed together forming a non-rotatable connection between clutch part 18 and clutch part 16. The clutch part 16 is provided with knobs which in a manner known per se extend axially outwards with intermediate interspaces. Axial borings are made in the knobs in which borings the pressure springs 22 are positioned applied against the periphery of the pressure plate 26. Protrusions of the discs 20 extend into said interspaces such that the discs 20 are un-rotatably secured to the clutch part 16 but axially movable with respect to said part.

The discs 21 are non-rotatably connected by a spline connection to the clutch part 18. Its axially inner part facing the gear 8 is journalled by a needle bearing 33 in a recess 34 in the center portion of the gear 8.

Further, an oil supply channel 35 is arranged in the end wall part 12, which channel communicates with a slit 36 between the inner periphery 37 of the annular piston 24 and the outer periphery of a part of the clutch part 18 designed to form a driving shaft 38.

The clutch part 18 has a part designed as a hub 39. Said spline connection is arranged on the exterior of the hub for non-rotatable connection to the discs 21. The hub 39 has a side wall 41 provided with apertures 40, and at the other end a radial, inwardly directed side edge 42.

The slit 36 is extended by a collar 43 integrated with the annular piston 24, which collar extends all the way into the hub 39 shaped like a drum.

At supply of oil to the channel 35, the oil will flow in the slit 36 and along collar 43 into the rotating hub 39 where the oil by the action of the centrifugal force is collected between the side edges 41,42 and will flow out over the edge 42 to the axially outermost situated discs 20,21 and through the apertures 40 to the axially innermost situated discs 20,21, which in previously known clutches suffered from want of oil and, accordingly, were worn out rapidly. In order to ensure a sufficient supply of oil also to the middle discs 20,21, further apertures 44 may be arranged in the hub 39 in line with the middle discs.

Due to the fact that hub 39 is attached to the driving shaft 38 its rotation will under the influence of the centrifugal force throw the oil out towards the discs and at disconnection flush the oil out between the discs which then are subjected to an extremely effective cooling. This is especially important at frequently occurring connections and disconnections that often occur especially to superchargers connected to internal combustion engines.

What is claimed is:

1. An oil-cooled disc clutch comprising:
   a first group of discs interleaved by discs of a second group of discs, said discs of the first group of discs being non-rotatably attached to a central axial hub which is shaped like a drum with inwardly directed side edges, and said discs of the second group of discs being non-rotatably attached to an axial sleeve surrounding the second group of discs;

a channel arranged to supply cooling and lubricating oil to the drum-shaped central axial hub, said drum-shaped axial hub being provided with apertures for axial distribution of the cooling and lubricating oil to the first and second groups of discs;

a piston for axial compression of the first and second groups of discs via a thrust bearing, said piston being journalled in a clutch housing in line with a driving shaft with a slit provided between the piston and the driving shaft; and a collar provided on the piston and axially extending the slit, said collar extending into the drum-shaped axial hub for directing the cooling and lubricating oil through the slit to the drum-shaped central axial hub.

2. The disc clutch of claim 1, wherein said drum-shaped central axial hub is attached to the driving shaft.

3. The disc clutch of claim 1, wherein said drum-shaped central axial hub is rotatable so as to generate a centrifugal force which causes the cooling and lubricating oil to collect between the inwardly directed side edges of the drum-shaped central axial hub and then flow out over one of the inwardly directed side edges to outermost situated ones of the first and second groups of discs.

4. The disc clutch of claim 3, wherein said drum-shaped central axial hub further comprises apertures arranged in line with middle discs of the first and second groups of discs for distribution of the cooling and lubricating oil therethrough to the middle discs of the first and second groups of discs.

5. The disc clutch of claim 1, wherein said drum-shaped central axial hub comprises a side wall provided with apertures through which the cooling and lubricating oil may flow to innermost situated ones of the first and second groups of discs.

* * * * *